United States Patent
Pirskanen

(10) Patent No.: US 11,855,774 B2
(45) Date of Patent: Dec. 26, 2023

(54) SOLUTION FOR SEPARATING TRANSMISSIONS FROM DIFFERENT NETWORKS

(71) Applicant: WIREPAS OY, Tampere (FI)

(72) Inventor: Juho Pirskanen, Kangasala (FI)

(73) Assignee: WIREPAS OY, Tampere (FI)

( * ) Notice: Subject to any disclaimer, the term of this patent is extended or adjusted under 35 U.S.C. 154(b) by 168 days.

(21) Appl. No.: 17/167,125

(22) Filed: Feb. 4, 2021

(65) Prior Publication Data

US 2021/0250120 A1 Aug. 12, 2021

(30) Foreign Application Priority Data

Feb. 11, 2020 (FI) ...................................... 20205138

(51) Int. Cl.
*H04L 1/00* (2006.01)
*H04L 45/74* (2022.01)
*H04L 69/323* (2022.01)

(52) U.S. Cl.
CPC ............ *H04L 1/0045* (2013.01); *H04L 45/74* (2013.01); *H04L 69/323* (2013.01)

(58) Field of Classification Search
CPC ..... H04L 1/0045; H04L 45/74; H04L 69/323; H04L 1/0041; H04L 1/0061; H04L 69/22; H04W 4/80; H04W 88/06
See application file for complete search history.

(56) References Cited

U.S. PATENT DOCUMENTS

| | | | | |
|---|---|---|---|---|
| 9,008,630 B2 * | 4/2015 | Lazaridis | ............... | H04W 76/11 455/412.2 |
| 2003/0112805 A1 * | 6/2003 | Stanton | ............... | H04L 67/1097 370/463 |

(Continued)

OTHER PUBLICATIONS

ETSI TR 103 635 V1.1.1 (Nov. 2019) DECT-2020 New Radio (NR) interface; Study on MAC and higher layers. [online], Nov. 15, 2019, [retrieved on Sep. 2, 2020]. Retrieved from <http://www.etsi.org/deliver/etsi_tr/1 03600_1 03699/1 03635/01.01.01_60/tr_1 03635v01 0101 p.pdf>, sections 7.1.4, 7.9.2, 8.2.3, 8.3.2, 8.3.6.2, 8.4.5, 8.5.3-8.5.4; figures 14-15, 23-24, 37 sections 8.2.3, 8.3.7, 8.4.1; 8.4.4, 8.5.4; figure 39.

Wirepas Oy, ETSI Draft, DECT(20)000016r1: DECT-2020 MAC Model and proposed text toTS., Jan. 16, 2020, [retrieved on Sep. 2, 20202]. doc box. etsi. org/DECT/DECT/05-CONTRI BUT I ONS/ 2020/ DECT(20)00016r1_DECT-2020_MAC_Model_and_proposed_text_to_TS.docx, the whole document, in particular figure 3.

(Continued)

*Primary Examiner* — Thien Nguyen
(74) *Attorney, Agent, or Firm* — Thomas | Horstemyer, LLP

(57) ABSTRACT

The invention relates to a communication apparatus comprising a processor part, and a data transfer part. The apparatus is configured to receive, by the data transfer part, a packet comprising a network identification code (NIC) of a communication apparatus that transmitted the packet. A header field of the packet comprises a first part of the NIC and a second part of the NIC is included in another field of the packet. The apparatus is further configured to define, by the processor part, that the received packet is from a network to which the communication apparatus belongs, if the first part of the NIC of the received packet corresponds to the first part of the NIC of said communication apparatus. The invention relates also to method for a communication apparatus, a communication system, a computer program, and a computer readable medium.

24 Claims, 3 Drawing Sheets

(56) References Cited

U.S. PATENT DOCUMENTS

| | | | | |
|---|---|---|---|---|
| 2003/0169738 | A1* | 9/2003 | McDaniel | H03M 13/09 |
| | | | | 370/392 |
| 2010/0115174 | A1* | 5/2010 | Akyol | G06F 13/385 |
| | | | | 710/316 |
| 2013/0044607 | A1* | 2/2013 | Liu | H04L 27/2613 |
| | | | | 370/242 |
| 2013/0046867 | A1* | 2/2013 | Seelman | H04L 12/2807 |
| | | | | 709/221 |
| 2015/0146726 | A1* | 5/2015 | Zhao | H04L 45/54 |
| | | | | 370/392 |
| 2015/0236823 | A1* | 8/2015 | Djukic | H04L 1/0038 |
| | | | | 714/748 |
| 2015/0358228 | A1* | 12/2015 | Burgio | H04L 45/22 |
| | | | | 370/392 |
| 2016/0055473 | A1* | 2/2016 | Lin | G06Q 20/3274 |
| | | | | 235/380 |
| 2016/0057056 | A1* | 2/2016 | Gasparakis | H04L 45/74 |
| | | | | 370/392 |
| 2016/0179745 | A1* | 6/2016 | Nakayama | G06F 13/4022 |
| | | | | 710/316 |
| 2018/0196710 | A1* | 7/2018 | Iyer | G06F 11/1004 |
| 2019/0058568 | A1* | 2/2019 | Taniguchi | H04L 1/1812 |

OTHER PUBLICATIONS

DSPG Edinburgh LTD, ETSI Draft, DECT(18)000025r3: MAC proposal for DECT-2020, Mar. 5, 2018, [retrieved on Sep. 2, 2020]. docbox.etsi.org/DECT/DECT/05-CONTRIBUTIONS/2018/DECT(18)000025r3_MAC_proposal_for_DECT-2020.doc, the whole document, in particular section 9.

Wirepass Oy: "On Identities in DECT-2020", ETSI Draft; DECT(19)000216, European Telecommunications Standards Institute (ETSI), 650 Route Des Lucioles, Sep. 30, 2019, pp. 1-5, retrieved from the internet on Sep. 30, 2019 at URL:docbox.etsi.org/DET/DECT/05-CONTRIBUTIONS/2019/DECT(19)000216_On-identities_in_DECT-2020.docx.

"Digital Enhanced Cordless Telecommunications (Dect); DECT-2020 New Radio (NR) interface; Study on MAC and higher layers," ETSI Technical Report, European Telecommunications Standards Institute (ETSI), vol. DECT, No. V1.1.1., Nov. 15, 2019 (pp. 1-127), retrieved from the Internet on Nov. 19, 2019 at URL:http://www.etsi.org/deliver/etsi_tr/103600_103699/103635/01.01.01_60/tr_103635v010101p.pdf.

European Search Report, EP Application No. 21156237, dated Jun. 23, 2021 (3 pages).

* cited by examiner

300

SOLUTION FOR SEPARATING TRANSMISSIONS FROM DIFFERENT NETWORKS

PRIORITY

This application claims priority of Finnish patent application number 20205138 which was filed on 11 Feb. 2020, the content of which is incorporated herein by reference.

TECHNICAL FIELD

The invention concerns in general the technical field of wireless communication. Especially the invention concerns wireless communication networks.

BACKGROUND

A network identification code is needed when multiple networks are operating on same spectrum at the same geographical area. The network identification code may be used to separate transmissions from different networks from each other. The network identification code needs to be long enough, i.e. number of bits, to provide at least local uniqueness of the network that is transmitted every packet transmission. For example, the length of the network identification code may be 24, 32 or 48 bits. Such bit sequence for network identification code at each packet transmission is quite considerable amount of overhead especially when data transmissions are sufficiently small, which may be the case e.g. in Internet of Things (IoT) operation. For example, if data amount transmitted by an IoT device as a single data burst is 32 bytes, resulting that if the network identification code with length of 24 to 48 bits is used in each of the packet transmission, the introduced overhead is between 9 to 19 percent.

In Wireless Local Area networks (WLAN) and Bluetooth Low Energy (BLE) networks the network identification code may be added into each packet. BLE uses 32 bits long address in a header of the packet after general synchronization field. In BLE the network identification code is called as access address, even though it may be also used for forming BLE mesh networks. In WLAN each packet comprises a Basic service set (BSS) ID that is 48 bit address field which is Medium access (MAC) address of an access point (AP), so that this BSS ID identifies that certain transmission is part of this BSS. Additionally, in WLAN Service set identifier (SSID) may be used, which is transmitted in a beacon message that is the same for all BSS parts of the network. Thus, each packet transmission in WLAN comprises BSS ID (48 bits) receiver MAC address (48 bits) and transmitter MAC address (48 bit). Thus, the WLAN solution is very brute force. Cellular systems relay on the fact that each network operates at separate licensed frequency or when operating at unlicensed the assumption is that there are no overlapping frequencies between networks.

Therefore, there is a need to develop further solutions to separate transmissions from different networks from each other, especially when they are operating in overlapping spectrum.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present communication apparatuses, methods, a system, and a computer program. Another objective of the invention is that the apparatuses, the methods, the system, and the computer program enables a simple way to separate transmissions from different networks from each other, especially when they are operating in overlapping spectrum.

The objectives of the invention are reached by methods, apparatuses, a system and a computer program as defined by the respective independent claims.

According to a first aspect, a communication apparatus is provided, wherein the communication apparatus comprises: a processor part, and a data transfer part, wherein the apparatus is configured to: receive, by the data transfer part, a packet comprising a network identification code (NIC) of a communication apparatus that transmitted the packet, wherein a header field of the packet comprises a first part of the NIC and a second part of the NIC is included in another field of the packet; and define, by the processor part, that the received packet is from a network to which the communication apparatus belongs, if the first part of the NIC of the received packet corresponds to the first part of the NIC of said communication apparatus.

The header field of the packet may further comprise identification information representing the transmitting communication apparatus and/or identification information representing the receiving communication apparatus.

Furthermore, the communication apparatus may be configured to perform a further confirmation that the received packet is from the network to which the communication apparatus belongs based on the identification information representing the transmitting communication apparatus and/or the identification information representing the receiving communication apparatus.

Alternatively or in addition, the second part of the NIC may be included in an error detection code of a data field of the packet.

The error detection code may be Cyclic Redundant Check (CRC), and in response to definition that the received packet is from the network to which the communication apparatus belongs, the communication apparatus may further be configured to: perform a XOR operation for the second part of the NIC with one of the following: the CRC defined for the data field of the received packet or the CRC included in the data field of the received packet; compare the result of the XOR operation to the other one of the following: the CRC defined for the data field of the received packet or the CRC included in the data field of the received packet; and define that the reception of the packet was correct, if the result of the XOR operation corresponds with the CRC to which it is compared.

The communication apparatus may further be configured to: determine a message indicating a correct reception of the packet to be transmitted to the communication apparatus from which the packet is received, in response to the detection of a correct reception; or determine a message indicating an incorrect reception of the packet to be transmitted to the communication apparatus from which the packet is received, in response to the detection of an incorrect reception.

Alternatively or in addition, the communication apparatus may further be configured to: define that the received packet is from another network, if the first part of the NIC of the received packet differs from the first part of the NIC of the communication apparatus, and obtain information representing activity of said another network based on at least one packet received from said another network.

Alternatively or in addition, the communication apparatus may be configured to obtain the NIC by configuration, other communication technique, or receiving a broadcast message comprising the NIC.

Alternatively or in addition, the packet may be a physical (PHY) layer packet.

Alternatively or in addition, the NIC may be independent from an actual Network ID of the network, the NIC may be at least partly derived from the actual Network ID of the network, or the NIC may be directly the actual Network ID of the network.

Alternatively or in addition, the network may be a wireless mesh network, a wireless Bluetooth Low Energy (BLE)-based radio network, a wireless local area network (WLAN), Thread network, Zigbee network, Public Land Mobile Network (PLMN), or cellular network.

According to a second aspect, a communication apparatus is provided, wherein the communication apparatus comprises: a processor part, and a data transfer part, wherein the apparatus is configured to: determine, by the processor part, a packet to be transmitted, by the data transfer part, to at least one other communication apparatus, the transmitted packet comprises a network identification code (NIC) of said communication apparatus, wherein a header field of the packet comprises a first part of the NIC and a second part of the NIC is included in another field of the packet.

The header field of the packet may further comprise identification information representing the transmitting communication apparatus and/or identification information representing the receiving communication apparatus.

Alternatively or in addition, the second part of the NIC may be included in an error detection code of a data field of the packet.

The error detection code may be Cyclic Redundant Check (CRC), and the communication apparatus may further be configured to: perform a XOR operation for the second part of the NIC with the CRC defined for the data field of the packet, and include the result of the XOR operation in the data field of the transmitted packet as the error detection code.

Alternatively or in addition, the communication apparatus may be configured to obtain the NIC by configuration, other communication technique, or receiving a broadcast message comprising the NIC.

Alternatively or in addition, the packet may be a physical (PHY) layer packet.

Alternatively or in addition, the NIC may be independent from an actual Network ID of the network, the NIC may be at least partly derived from the actual Network ID of the network, or the NIC may be directly the actual Network ID of the network.

Alternatively or in addition, the network may be a wireless mesh network, a wireless Bluetooth Low Energy (BLE)-based radio network, a wireless local area network (WLAN), Thread network, Zigbee network, Public Land Mobile Network (PLMN), or cellular network.

According to a third aspect, a communication system is provided, wherein the communication system comprises: a plurality of communication apparatuses comprising a first communication apparatus and a second communication apparatus; wherein each communication apparatus of the system is configured to provide a bi-directional radio communication with at least one other communication apparatus of the system; wherein the first communication apparatus is configured to determine a packet to be transmitted to at least the second communication apparatus, the transmitted packet comprises a network identification code (NID) of the first communication apparatus, wherein a header field of the packet comprises a first part of the NIC and a second part of the NIC is included in another field of the packet; and wherein the second communication apparatus is configured to: receive the packet transmitted by the first communication apparatus, and define that the received packet is from the network to which the second communication apparatus belongs, if the first part of the NIC of the received packet corresponds to the first part of the NIC of the second communication apparatus.

According to a fourth aspect, a method for a communication device as described above is provided, wherein the method comprises steps of: receiving a packet comprising a network identification code (NIC) of a communication apparatus which transmitted the packet, wherein a header field of the packet comprises a first part of the NIC and a second part of the NIC is included in another field of the packet; and defining that the received packet is from a network to which the communication apparatus belongs, if the first part of the NIC of the received packet corresponds to the first part of the NIC of said communication apparatus.

According to a fifth aspect, a method for a communication device as described above is provided, wherein the method comprises steps of: determining a packet to be transmitted to at least one other communication apparatus, the packet comprises a network identification code (NIC) of the communication apparatus, wherein a header field of the packet comprises a first part of the NIC and a second part of the NIC is included in another field of the packet.

According to a sixth aspect, a computer program is provided, wherein the computer program comprises instructions which, when the program is executed by a communication apparatus as described above, cause the communication apparatus to carry out at least the steps of the methods as described above.

According to a seventh aspect, a computer readable medium is provided, wherein the computer readable medium comprises the computer program as described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
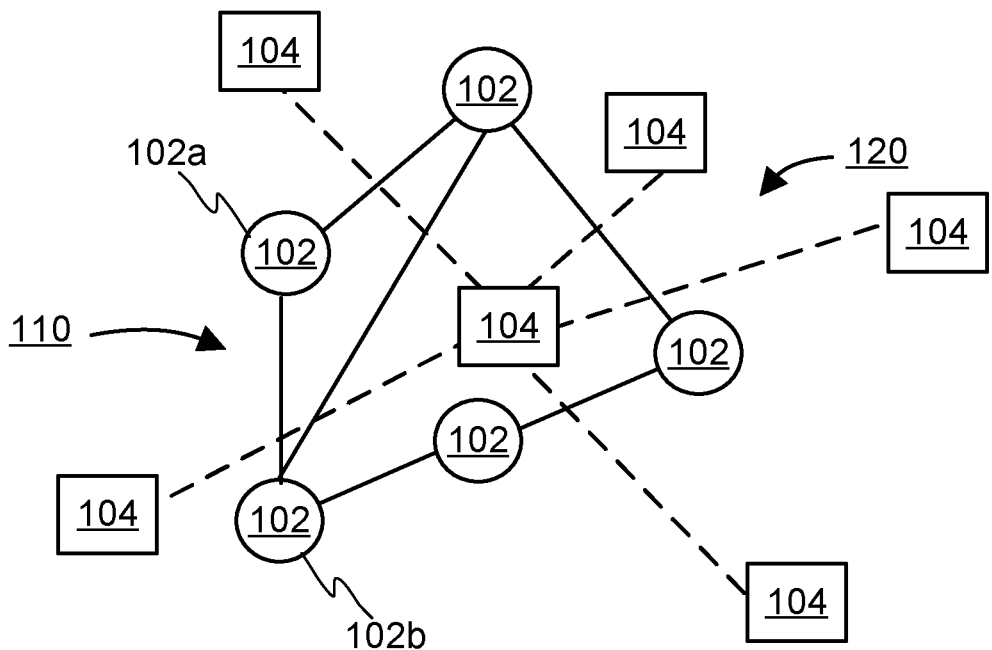
FIG. 1 illustrates schematically an example environment wherein the embodiments of the invention may be implemented.

FIG. 1 illustrates an example environment, wherein the embodiments of the invention may be implemented as will be described. The example environment comprises a first wireless communication network, i.e. system, 110 and a second wireless communication network, i.e. system, 120. The first wireless communication network 110 comprises a plurality of wireless communication apparatuses 102 (illustrated with circles in FIG. 1). The second wireless communication network 120 comprises a plurality of wireless communication apparatuses 104 (illustrated with squares in FIG. 1). The first wireless communication network 110 and the second communication network 120 are operating on the same spectrum at the same geographical area, i.e. within the example environment. Because of the same spectrum use radio transmissions transmitted by the communication apparatuses 102 of the first network 110 may be received by the communication apparatuses 104 of the second network 120 and vice versa. In order to separate the transmissions of the first network 110 from the transmissions of the second network 120, the communication apparatuses 102 of the first network 110 are configured to use a network identification code (NIC) representing the first network 110 in their transmissions. Furthermore, in order to separate the transmissions of the second network 120 from the transmissions of the first network 110, the communication apparatuses 104 of the second network 120 are configured to use a NIC representing the second network 120 in their transmissions. Each communication apparatus 102, 102a, 102b, 104 according to the invention is configured to add the NIC according to the invention as will be described into each packet, which the apparatus 102, 102a, 102b, 104 transmits.

The solution according to the present invention described in this application may be implemented to any wireless communication network that uses frequent signaling of the NIC. Preferably, the solution according to the present invention may be implemented in wireless communication networks complying DECT-2020 standard. Some non-limiting example wireless communication networks to which the solution according to the present invention may be implemented may comprise, but is not limited to, BLE mesh network, Thread network, Zigbee network, Public Land Mobile Network (PLMN), WLAN network, cellular network, or wireless mesh network, e.g. wireless sensor network, and/or any other wireless networks.

Typically, communication apparatuses 102, 102a, 102b, 104 of the network 110, 120 are capable to receive transmissions with one radio technology, e.g. BLE transmissions or WLAN transmission, which transmission are all from the same network 110, 120. However, according to an example of the invention, one or more communication apparatuses 102, 102a, 102b, 104 of the network 110, 120 may be capable to receive transmissions with two or more radio technologies, e.g. BLE transmissions and WLAN transmissions, which transmission are all from the same network 110, 120.

DECT-2020 is radio access technology developed by ETSI. DECT-2020 supports massive machine type communication (mMTC) and ultra-reliable low latency communication (URLLC). On Physical (PHY) layer the key technology components of the DECT-2020 are: Orthogonal frequency-division multiplexing (OFDM), adaptive modulation and coding schemes (MCS), Modern Channel coding methods (Turbo, LDPC, Convolutional coding), Hybrid automatic repeat request (HARQ) for both scheduled and contention based transmissions, and support of multi-antenna transmissions with different Multiple-Input and Multiple-Output (MIMO) streams. On Medium access (MAC) layer and from system aspects the key technology components of the DECT-2020 are: support of high number of IoT sensors, actuators and other industrial applications; support of Mesh network topology, support of URLLC communication with very short delay (typical application may be wireless microphones); operation on frequencies, that are license exempt; and support of multiple overlapping non-coordinated networks with cognitive radio capabilities to share spectrum resources between multiple networks.

Figure 2:
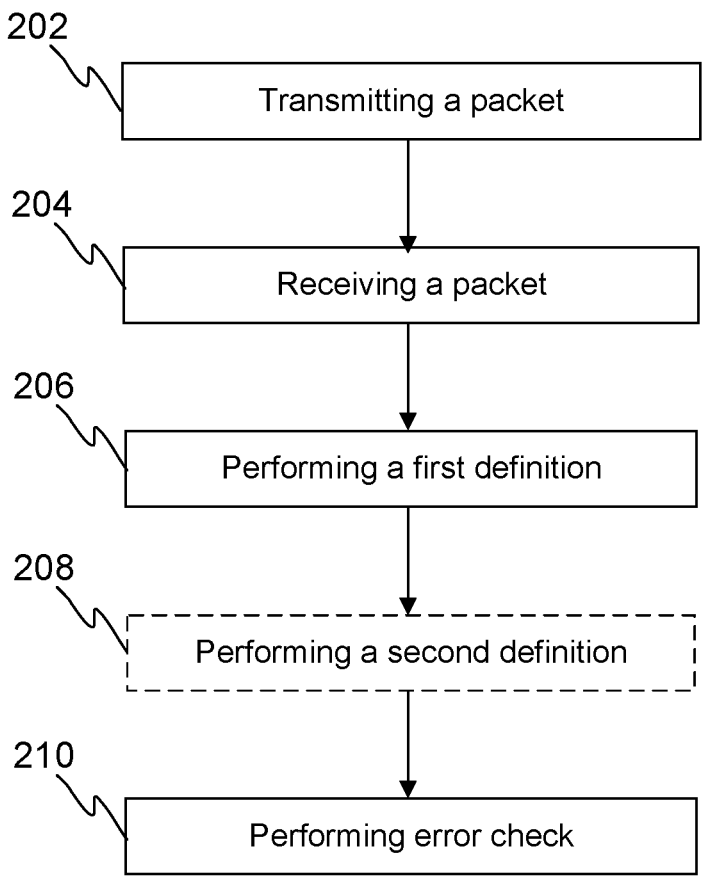
FIG. 2 illustrates schematically an example of the method according to the invention.

Next an example of a method according to the invention is described by referring to FIG. 2. FIG. 2 schematically illustrates the invention as a flow chart. The example method is described by using two communication apparatuses, i.e. a first communication apparatus 102a and a second communication apparatus 102b, both belonging to the same network 110. However, the network 110 according to the invention may comprise a plurality of communication apparatuses 102 comprising the first communication apparatus 102a and the second communication apparatus 102b. Each communication apparatus 102, 102a, 102b of the network 110 may be configured to provide a bi-directional radio communication with at least one other communication apparatus 102 of the system 110. In other words, each communication apparatus 102, 102a, 102b may act as a transmitting apparatus and/or as a receiving apparatus. However, in the example method the first communication apparatus 102a is acting as the transmitting apparatus and the second communication apparatus 102b is acting as the receiving apparatus. Each communication apparatus 102, 102a, 102b of the network 110 is capable to transmit and receive one or more packets. Preferably, the transmitting apparatus and the receiving apparatus may be identical with each other. However, the invention is not limited to that.

At a step 202, the first communication apparatus 102a determines a packet 300 to be transmitted to at least the second communication apparatus 102b. The first communication apparatus 102a further transmits the determined packet 300. The transmission of the packet 300 may be e.g. a broadcast transmission or a unicast transmission. The broadcast transmission may be destinated to all the apparatuses 102, 102b of the network 110 or to a group of apparatuses 102, 102b of the network 110, i.e. multicast transmission. The unicast transmission may be destinated to a single apparatus 102, 102b of the network 110.

Figure 3A:
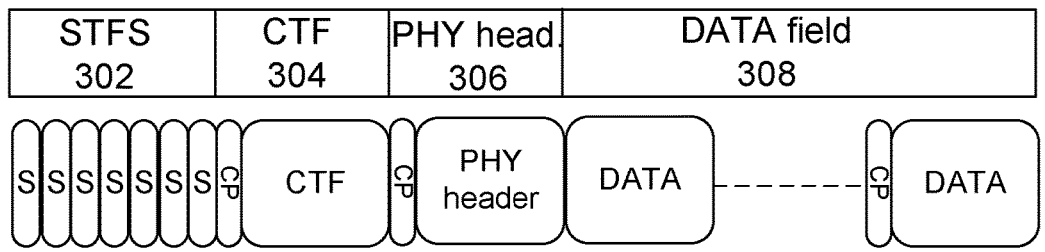
FIG. 3A illustrates schematically an example format of a packet according to the invention.

FIG. 3A illustrates schematically an example format of the packet 300 according to the invention. However, the invention is not limited to that and any other packet format may be used. The packet 300 may be, but is not limited to, a PHY layer packet 300 as illustrated in the example of FIG. 3A. The example packet format of FIG. 3A comprises the following fields: Synchronization Training Field Symbols (STFS) 302, channel training field (CTF) 304, PHY header field, i.e. PHY control field, 306, and data field 308. The STFS field 302 is used to provide time and frequency synchronization for the receiving apparatus. Additionally, the STFS field 302 may be used to other purposes, such as adjusting gain of the receiving apparatus. The CTF field 304 is used for channel estimation purposes in the receiving apparatus. The PHY header field 306 is used to transmit necessary information how the data field is transmitted. The PHY header field 306 may comprise, but is not limited to, information used Modulation and coding scheme (MCS), a receiver address (i.e. a receiver ID), and/or a transmitter address (i.e. transmitter ID). Data field 308 comprises the MAC protocol data unit (PDU). Moreover, the data field 308 is the field that is re-transmitted in a HARQ operation.

Figure 3B:
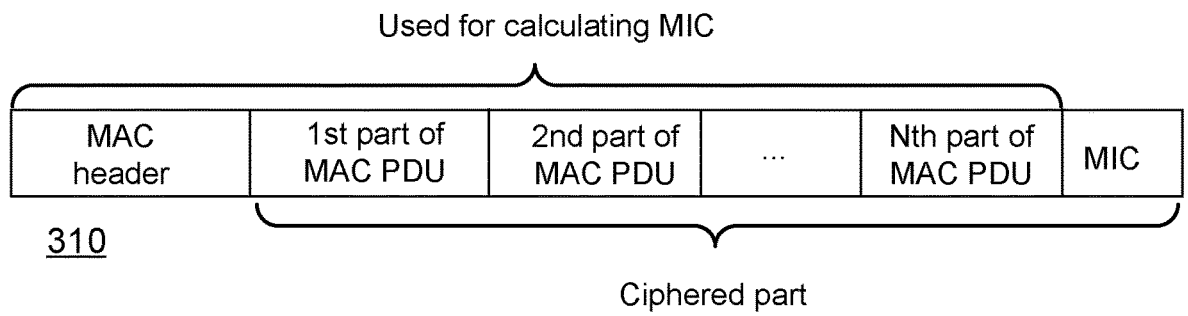
FIG. 3B illustrates schematically an example MAC PDU structure according to the invention.

FIG. 3B illustrates schematically an example MAC PDU structure 310, However, the invention is not limited to that and any MAC PDU structure may be used. The MAC PDU structure 310 comprises, a MAC header field, and one or more parts of MAC PDU data. The MAC header field is used to indicate to the receiving communication apparatus the content of the MAC PDU data as well as convey necessary parameters of a MAC level security (when used). The MAC level security is expected to cipher all other fields of the MAC PDU expect the MAC header field, whereas an integrity protection may be provided with a message integrity code (MIC) from the complete MAC PDU and added to end of the MAC PDU.

Figure 4A:
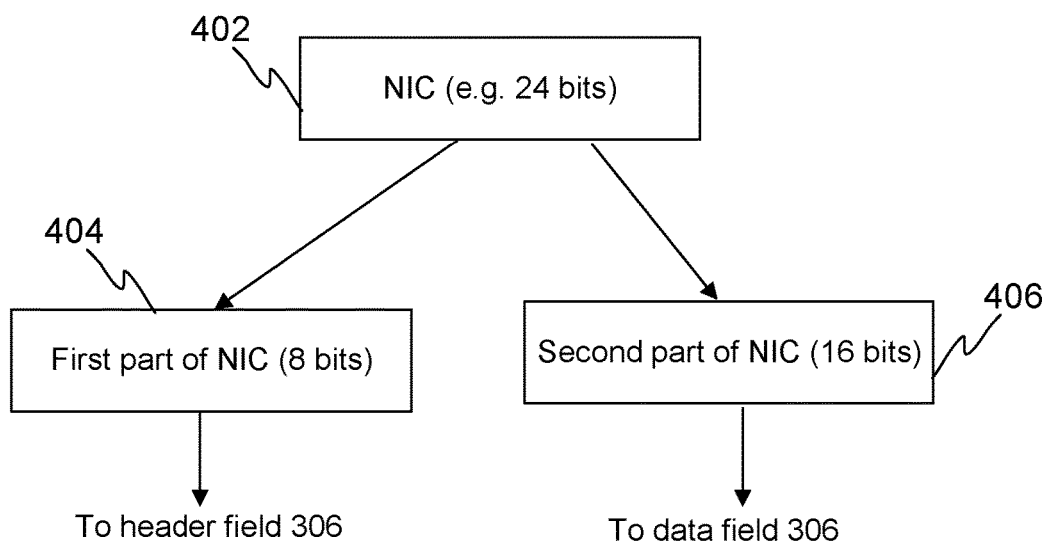
FIGS. 4A and 4B illustrate schematically simple examples of a network identification code structures according to the invention.

The transmitted packet 300 comprises the NIC 402 of the first communication apparatus 102, i.e. the NIC 402 representing, i.e. identifying, the network 110 to which the first communication apparatus 102a belongs. The NIC 402 is divided in two parts, i.e. to a first part 402 and to a second part 404. The first part of the NIC 404 comprises first x bits of the NIC 402, wherein the x is the length of the first part of the NIC 404. The second part of the NIC 406 comprises the rest y bits of the NIC 402, wherein the y is the length of the second part of the NIC 406. FIG. 4A illustrates schematically a simple example of a structure of the NIC 402 divided in the first part 404 and the second part 406. According to a non-limiting example, if the total length of the NIC 402 is 24 bits and the length of the first part of the NIC 404 is 8 bits, the first part of the NIC 404 comprises 8 first bits of the NIC 402 and the second part of the NIC 406 comprises the last 16 bits of the NIC 402 as illustrated in the example of FIG. 4A. A header field 306 of the packet 300, e.g. the PHY header field 306 in the example of FIG. 3, comprises the first part of the NIC. The first part of the NIC 404 may be included in the header field 306 of the packet 300 as a plain text.

According to an example of the invention, the header field 306, of the packet 300 may further comprise identification information representing, i.e. identifying, the transmitting apparatus, i.e. transmitter ID. Alternatively or in addition, the header field, 306, of the packet 300 may further comprise identification information representing, i.e. identifying, the receiving apparatus, i.e. receiver ID 408. The header field 306 may be protected with Cyclic Redundant Check (CRC) so that receiving apparatus, e.g. the second communication apparatus 102b, may ensure that reception of the PHY header field 306 was correct. The length of the CRC in PHY header field 306 may be e.g. 8 or 16 bits.

The second part of the NIC 406 is included in another field of the packet 300. Preferably, the second part of the NIC 406 may be included in the data field 308 of the packet 300. According to an example of the invention, the second part of the NIC 406 may be included in an error detection code of the data field 308 of the packet 300. Preferably, the error detection code may be CRC. However, the invention is not limited to that and any other suitable error detection code may be used. The data field 308 may be protected with the CRC so that the receiving apparatus, e.g. the second communication apparatus 102b, may ensure, i.e. check, whether the reception of the data field 308, i.e. the MAC PDU, was correct or not. This CRC may e.g. have length of 16 or 24 bits. The CRC of the data field 308 may be masked with the second part of the NIC 406, i.e. the second part of the NIC 406 may be included in the CRC of the data field 308 of the packet 300. In order to include the second part of the NIC 406 in the CRC of the data field 308 of the packet 300, the first communication apparatus 102a performs a XOR operation for the second part of the NIC 406 with a conventional CRC, i.e. a CRC defined for the data field of the packet 300. The conventional CRC may be defined for the data field of the packet 300 according to known techniques, e.g. based on a remainder of a polynomial division the content of the data field 308. After the XOR operation the first communication apparatus 102a includes, i.e. applies, the result of the XOR operation, i.e. modified CRC, in the data field 308 of the transmitted packet as the error detection code, i.e. the CRC, (instead of the conventional CRC) for the receiving communication apparatus, e.g. the second communication apparatus 102b, to be used to check whether reception of the data field 308 of the packet 300 was correct or not. The CRC is preferable error detection code to which the second part of the NIC 406 may be included, because CRC enables substantially easy and fast execution, i.e. calculation, processes. Moreover, because the CRC of the data field 308 of the packet 300 is needed in any case to check, by the receiving apparatus, whether reception of the data field 308 of the packet 300 was correct or not, including the second part of the NIC 406 in the CRC does not cause extra effort. Moreover, the inclusion of the second part of the NIC 406 in the CRC of the data field of the packet 300 may be implemented by using only one additional XOR process in the transmitting communication apparatus and in the receiving communication apparatus. This enables a simple apparatus implementation.

Figure 4B:
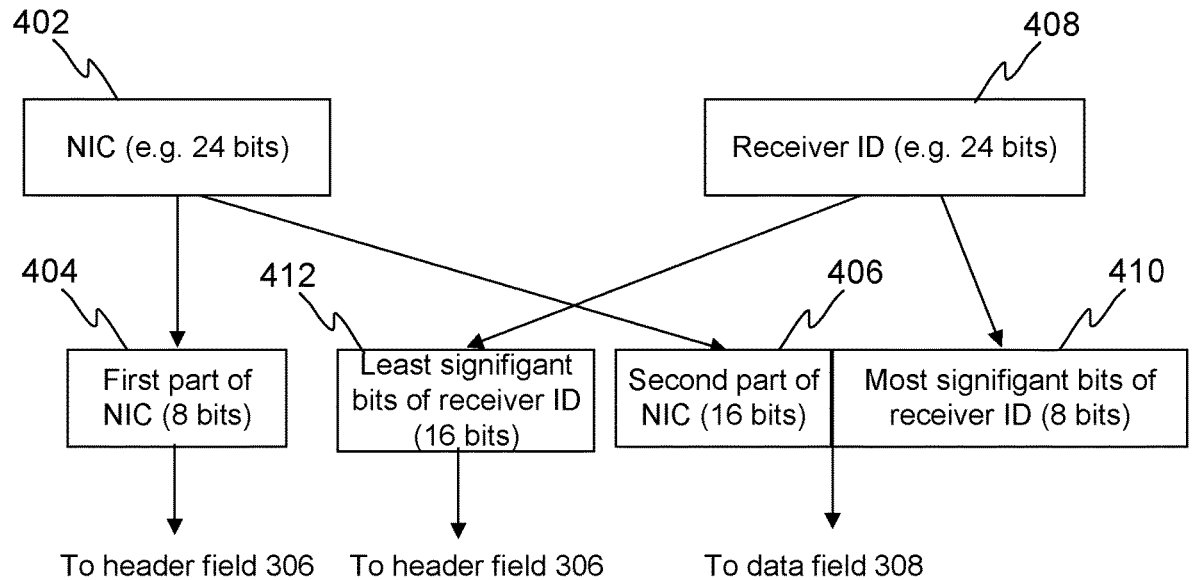

According to an example of the invention, the second part of the NIC 406 may be combined with other set off identification bits, such as bits from the receiver ID, i.e. the receiver address, 408 before including the second part of the NIC 406 to the CRC of the data field 308. FIG. 4B illustrates schematically an example of the structure of the NIC, wherein the second part of the NIC 406 is combined with 8 most significant bits of the receiver ID 410 as a single bit string. In this example, the length of the CRC of the data field 308 is 24 bits and the length of the second part of the NIC 406 is 16 bits. The second part of the NIC 406 and the 8 most significant bits of the receiver ID 410 may be combined as the single bit string so that in the XOR operation described above, the 16 most significant bits of the CRC are masked with the second part of the NIC 406 and then the 8 least significant part of the CRC is masked with the 8 most significant bits of the receiver ID 410. The receiver ID may be e.g. 24 bits, where 16 least significant bits 412 are transferred in the header field 306 of the packet 300, as a plain text or masked with the CRC of the PHY header field 306, and the 8 most significant bits of the receiver ID 410 are used to mask CRC of the data part 308 of the packet 300. Naturally, alternating exact number of bits or bit division between different set of bits may be possible According to an example of the invention, the size of the PHY header field 306 may be between 26 to 120 bits, even though other PHY header field 306 lengths are possible.

Preferably, the size of the PHY header field 306 may be approximately between 50 to 80 bits. The size of the PHY header field 306 may depend on the format of the packet 300. Alternatively or in addition, the size of the PHY header field 306 may depend on whether the CTF field may be used to transfer control channel bits or not. Above, it is discussed about the size of the PHY header field, but the same applies also to the header field of the packet 300, if the packet is packet of any other layer. According to an example of the invention, the total length of the NIC may be 24, 32, or 48 bits. Preferably, the total length of the NIC 402 may be 32 bits. Preferably, the length of the first part of the NIC 404 may be 8 bits or less causing that the length of the second part of the NIC 406 may be 16, 24, or 32 depending on the total length of the NIC 402. Alternatively, the length of the first part of the NIC 402 may be 16 bits causing that the that the length of the second part of the NIC 406 may be 24 or 32 depending on the total length of the NIC 402. Together the first part of the NIC 404 and the second part of the NIC 406 enables approximately several millions to billions unique NICs 402. The use of 8 bit long first part of the NIC 404 reduces the overhead of the transmission at the PHY header field 306. Moreover, the division of the NIC in two parts included in different fields of the packet 300 reduces the overhead of the transmission. Especially, in packets using substantially short slots the overhead of PHY header field 306 may be minimized to be able to use the short slots efficiently for application layer data. For example, DECT-2020 supports 1.728 MHz channel bandwidth with 27 kHz subcarrier spacing with only slot length of 10 ms/24=0.41666 ms (i.e. the frame time is 10 ms and the frame is split into 24 time slots).

At a step 204, the second communication apparatus 102*b* receives a packet 300. The received packet 300 may be the packet 300 transmitted by the first communication apparatus 102*a* or a packet transmitted by any other communication apparatus belonging to the same network, i.e. the network 110, with the second communication apparatus 102*b* or belonging to another network, e.g. network 120. The received packet 300 comprises the NIC 402 of the communication apparatus which transmitted the packet 300, wherein the header field 306 of the packet 300 comprises the first part of the NIC 404 and the second part of the NIC 406 is included in another field of the packet 300 as discussed above referring to the transmitted packet 300. For sake of simplicity, in this example the received packet may be considered to be the packet 300 transmitted by the first communication apparatus 102*a* and the above description about the transmitted packet 300 applies also to the received packet. However, the invention is not limited to that. As discussed above, the PHY header field 306 of the packet 300 is protected with CRC. The second communication apparatus 102*b* ensures that reception of the PHY header field 306 was correct based on the conventional CRC operation.

At a step 206, the second communication apparatus 102*b* defines that the received packet 300 is from the network 110 to which the second communication apparatus 102*b* belongs. This may be called as a first definition step, wherein the second communication apparatus 102*b* compares the first part of the NIC 404 of the received packet 300 to the first part of the NIC 404 of the second communication apparatus 102*b*, i.e. the NIC representing, i.e. identifying, the network 110 to which the second communication apparatus 102*b* belongs. If the first part of the NIC 404 of the received packet 300 corresponds to the first part of the NIC 404 of the second communication apparatus 102*b*, the second communication apparatus 102*b* defines, at least provisionally, that the received packet 300 is from the network 110 to which the second communication apparatus 102*b* belongs, e.g. the packet 300 transmitted by the first communication apparatus 102*a* as discussed above. The inclusion of the NIC 402 to the PHY layer packet 300 enables that data from incorrect, i.e. wrong, networks is not forwarded to the higher layers, e.g. MAC layer, and it prevents acting on commands from incorrect networks. Moreover, this enables filtering out transmissions from incorrect networks as early as possible.

According to an example of the invention, if the first part of the NIC 404 of the received packet 300 differs from the first part of the NIC 404 of the second communication apparatus 102*b*, the second communication apparatus 102*b* may define that the received packet is from another network than the network 110 to which the second communication apparatus 102*b* belongs, e.g. from a communication apparatus 104 belonging to the second network 120. This allows that the second communication device 102*b* may detect, if there are one or more other networks, e.g. the second network 120, operating within the same environment using certain channel(s). Moreover, this is possible only by receiving the STFS field 302, the CTF field 304, and the PHY header field 306 of the packet 300, and it is not necessary to receive the data field 308 of the packet 308 correctly or at all. This allows the second communication apparatus 102*b* to save energy as it may skip reception of the data field 308 of the packet 300, if the received packet is from another network than the network 110 to which the second communication apparatus 102*b* belongs. In other words, this enables identification of the other networks operating on the same spectrum from each received packet, even though the data field 308 of the packet 300 would be ciphered and thus the content of the MAC PDU 310 could not be interpreted by the second communication apparatus 102*b* of the other network. Moreover, the second communication device 102*b* may obtain information representing activity of the one or more other networks based on at least one packet received from the one or more other networks. The information representing activity of the one or more other networks may comprise e.g. duty cycle and/or type of activity of the one or more other networks. The type of activity may be defined based on transmission type, e.g. broadcast or unicast, and/or periodicity of the transmissions. According to a non-limiting example, a detection of periodical transmissions from one communication apparatus belonging to another network, e.g. in every 5 milliseconds, 10 milliseconds, or 20 milliseconds with gaps between, may indicate an audio type system operation. The second communication device 102*b* may e.g. detect that the periodical transmissions are transmitted by one communication apparatus belonging to the other network based on the transmitter ID included in the PHY header field 306. According to another non-limiting example, a detection of a short transmission with a random interval from different communication apparatuses belonging to the same other network at certain channel may indicate a massive Internet of Things (IoT) type system operation. The identification of the other networks operating on the same spectrum enables that the communication apparatuses may recognize which networks and what type of transmissions are causing interference at specific channels, which cannot be done with a simple received signal strength indicator (RSSI) measurement typically used to avoid operating in highly interfered channels. For example, the DECT-2020 requires that devices have cognitive radio capabilities to avoid operating in highly interfered channels. Thus, the identification of the other networks operating on the same spectrum improves the cognitive radio capabilities of the communication apparatuses.

According to an example of the invention, if the header field 306 of the received packet 300 further comprises the transmitter ID and/or the receiver ID 408, the second communication apparatus 102b may perform a further confirmation at a step 208. This further confirmation may be performed after the definition that the received packet 300 is from the network 110 to which the second communication apparatus 102b belongs based on the first part of the NIC 404 included in the header field 306 of the packet 300 at the step 204. At a step 208 the second communication apparatus 102b performs the further confirmation that the received packet 300 is from the network 110 to which the second communication apparatus 102b belongs based on the transmitter ID and/or the receiver ID 408. This may be called as a second definition step, wherein the second communication apparatus 102b compares the transmitter ID and/or the receiver ID 408 included in the PHY header field 306 to the respective transmitter ID and/or receiver ID known by the second communication apparatus 102b from PHY header. If the compared transmitter IDs and/or receiver IDs 408 correspond with each other, the second communication apparatus 102b performs a second definition that the received packet 300 is from the network 110 to which the second communication apparatus belongs, e.g. the packet 300 transmitted by the first communication apparatus 102a as discussed above. For example, if the receiver ID 408 included in the PHY header field 306 of the received packet 300 is different than the receiver ID 408 of the second communication apparatus 102b, the second communication apparatus 102b may define that the received packet is not destinated to the second communication apparatus 102b.

At a step 210, in response to definition that the received packet 300 is from the network 110 to which the second communication apparatus 102b belongs at the step 206 or 208, the second communication apparatus 102b performs an error check to ensure whether the reception of the data field 308 of the received packet 300, i.e. the MAC PDU, was correct or not. As discussed above the second part of the NIC 406 may be included in the error detection code of the data field 308 of the packet 300. Preferably, the second part of the NIC 406 is included in the CRC of the data field 308 of the packet 300. To ensure that the communication apparatus 102b is the correct intended receiver of the received packet 300, the second communication apparatus 102b performs a reverse CRC operation. In other words, to ensure that the reception of the data field 308 of the received packet 300 was correct, the second communication apparatus 102b performs a XOR operation for the second part of the NIC 406 with the CRC defined for the data field 308 of the received packet 300 and compares the result of the XOR operation to the CRC included in the data field 308 of the received packet 300. If the result of the XOR operation corresponds with the CRC included in the data field 308 of the received packet 300, the second communication apparatus 102b defines that the reception of the packet was correct and the second communication apparatus 102b is the correct intended receiver of the packet 300, i.e. the packet 300 was intended for the second communication apparatus 102b. If the result of the XOR operation does not correspond with the CRC included in the data field 308 of the received packet 300, the second communication apparatus 102b defines that the reception of the packet 300 was incorrect. Alternatively, the second communication apparatus 102b may perform a XOR operation for the second part of the NIC 406 with the CRC included in the data field 308 of the received packet 300 and compares the result of the XOR operation to the CRC defined for the data field 308 of the received packet 300. If the result of the XOR operation corresponds with the CRC defined for the data field 308 of the received packet 300, the second communication apparatus 102b defines that the reception of the packet was correct and the second communication apparatus 102b is the correct intended receiver of the packet 300, i.e. the packet 300 was intended for the second communication apparatus 102b. If the result of the XOR operation does not correspond with the CRC defined for the data field 308 of the received packet 300, the second communication apparatus 102b defines that the reception of the packet 300 was incorrect. This enables that the second communication apparatus 102b may ensure that with a wrong NIC 402, e.g. NIC of another network than the network to which the second communication apparatus 102b belongs, the reception of the packet is never correct. This, in turn, reduces the possibility of acting or passing data included in the data field 308 of the received packet 300 to higher layers, e.g. MAC layer, from an incorrect network. The definition of the incorrect reception may be due to errors in bits string or due to wrong NIC 402, but in both cases the reception is not correct, and the data included in the data field 308 of the received packet 300, is not passed to the higher layers.

According to an example of the invention, if the CRC of data field 308 of the packet 300 is masked with the second part of the NIC 406 combined with the most significant bits of the receiver ID 410 as discussed above referring to example of FIG. 4B, the second communication apparatus 102b may perform the reverse CRC operation similarly as discussed above with addition that the second part of the NIC 406 and the 8 most significant bits of the receiver ID 410 are combined as the single bit string so that in the XOR operation described above, the 16 most significant bits of the CRC are masked with the second part of the NIC 406 and then the 8 least significant part of the CRC is masked with the 8 most significant bits of the receiver ID 410 to ensure that the communication apparatus 102b is the correct intended receiver of the received packet 300.

According to an example of the invention, in response to detection of a correct reception of the packet at the step 210, the second communication apparatus 102b may determine a message indicating a correct reception of the packet 300 to be transmitted to the communication apparatus, from which the packet 300 is received, e.g. first communication apparatus 102a. According to an example, the message indicating the correct reception may be e.g. an acknowledgement (ACK) signal. Alternatively, in response to the detection of an incorrect reception of the packet 300 at the step 210, the second communication apparatus 102b may determine a message indicating an incorrect reception of the packet 300 to be transmitted to the communication apparatus, from which the packet 300 is received, e.g. first communication apparatus 102a. According to an example, the message indicating the incorrect reception may be e.g. a negative-acknowledgement (NACK) signal. In response to receiving the message indicating the incorrect reception of the packet 300, the transmitting apparatus, e.g. the first communication apparatus may re-transmit the packet 300.

There may exists a minor possibility that the first part of the NIC 404, the transmitter ID and the receiver ID 408 included in the header field 306 of a packet 300 received from another network matches with the first part of the NIC 404 of the second communication device 102b and the transmitter ID and the receiver ID 408 known by the second communication apparatus 102b. In this case the second communication apparatus 102b may consider the packet transmitted from another network, e.g. from the second network 120, to be valid for the second communication apparatus 102b, but the error check at the step 210 fails, because the second part of the NIC 406 of the other network does not correspond to the second part of the NIC 406 of the second communication apparatus 120b and as discussed above with the wrong NIC 402 the reception of the packet 300 is never correct. In response to defining that the reception of the packet was incorrect, the second communication apparatus 102b may transmit the message indicating the incorrect reception, e.g. NACK, to the communication apparatus that transmitted the packet 300. Additionally, if the CRC of data field 308 of the packet 300 is masked with the second part of the NIC 406 combined with the most significant bits of the receiver ID 410 as discussed above, the possibility that a receiving communication apparatus from the same network, i.e. using the correct NIC, receives a packet 300 that is not intended for it may further be reduced as the receiver ID comprising 16 bits in the PHY header field with the additional 8 bits in the CRC of the data field 308, having total of 24 bit resulting over 16.7 million addresses.

According to an example of the invention, if the received packet is a uncast transmission, the transmission of the message indicating the incorrect reception, e.g. NACK, may be omitted, if the transmitter ID included in the header field 306 of the received packet 300 does not match with the transmitter ID of the communication apparatus with which the second communication apparatus 102b has associated. The uncast transmission may be applied between two apparatuses that have associated with each other. There may also be a minor possibility that an incorrect receiving communication apparatus transmits a NACK transmission. The transmitting communication apparatus may then receive one or more NACKs. One from the incorrect communication apparatus, which belongs to another network, and one from a correct receiving communication apparatus belonging to the same network with the transmitting communication apparatus. Alternatively, the transmitting communication apparatus may receive an ACK from a correct receiving communication apparatus belonging to the same network with the transmitting communication apparatus and a NACK from the incorrect communication apparatus, which belongs to another network. In the first case retransmission of the packet 300 is any how applied, because no ACK is received at the transmitting communication apparatus of the packet 300. In the latter case the transmitting communication apparatus may stop the re-transmissions as it has received the ACK. There may also be possibility that the transmitting communication apparatus does not receive neither ACK or NACK, because the feedback, i.e. ACK or NACK, transmissions comprising a HARQ feedback might be colliding. In this case the transmitting communication apparatus may apply re-transmission as it may assume that the reception of the PHY header field 306 was not correct. This may be a very rare case and not permanent transmission state and if it continues the transmitting communication apparatus may stop transmission of the packet to that receiving communication apparatus and consider that radio communication failed, which is more typically happening due to extensive path loss or high interference conditions. However, the possibility that the transmitting communication apparatus would receive ACK from wrong receiving communication apparatus may be avoided.

As the reception is never correct with a wrong NIC 402, the receiving apparatuses, e.g. the second communication apparatus 102b, need to be aware of the first part of the NIC 404 and the second part of the NIC 406. In other words, the network 110 has a process to provide the first part of the NIC 404 and the second part of the NIC 406 to the communication apparatuses 102 belonging to the network 110. According to an example, this may be provided by configuration of the communication apparatus or by other communication method, such as by using Near Field Communication (NFC). Alternatively or in addition, the network 110 itself may provide this by supporting a network beacon message, i.e. a system information broadcast, that may be send with a PHY header field that may comprise, but is not limited to, the first part of the NIC 404. Additionally, the CRC of the data field of the beacon message is not masked with second part of the NIC 406, i.e. the data field of the beacon message does not include the second part of the NIC 406, rather it is not masked at all or is masked with a pre-defined value that may be given in network standard. The actual MAC PDU of the beacon message then contains both parts of the NIC 402, either separately coded (i.e. two separate fields) or as a single field, wherein the first x bits are used as the first part of the NIC 404 and the rest y bits are used as the second part of the NIC 406. The x is the length of the first part of the NIC 404 as discussed above. The y is the length of the second part of the NIC 406 as discussed above. This allows the network to change the used NIC 402, e.g. in a case that the network identifies that there is collision in the first part of the NIC 404 or in the complete NIC 402. Alternatively, the receiving communication apparatus may obtain the first part of the NIC 404 from the PHY header field and the second part of the NIC 406 from data field of the beacon message. Only the communication apparatuses 102 desiring to operate in that network may act on the beacon message and other communication apparatuses may ignore the beacon message. The beacon message may further comprise an actual, i.e. long, network ID, such as PLMN ID or Service set identifier (SSID), that is human readable. The network according to the invention may operate so that it transmits the actual network ID, such as PLMN ID or SSID in a system information broadcast in a cellular network or in beacon in a WLAN network, in addition to the NIC 402. This enables that the NIC 402 may be local even though the actual network ID is global.

According to an example of the invention, the NIC 402 may be independent from the actual Network ID, such as SSID or PLMN ID. Alternatively, the NIC 402 may be derived from the actual Network ID or it may be directly the actual Network ID.

Figure 5:
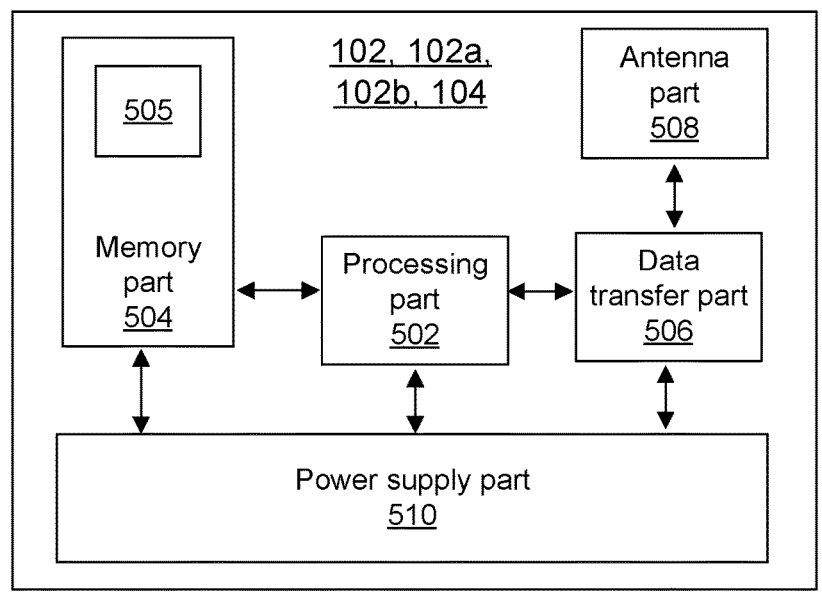
FIG. 5 illustrates an example of a communication apparatus according to the invention.

FIG. 5 illustrates an example of a communication apparatus (device) 102, 102a, 102b, 104 according to the invention. The communication apparatus 102, 102a, 102b, 104 comprises a processing part 502 that is configured to perform user and/or computer program (software) initiated instructions, and to process data in order to run an application and communication protocol. The processing part 502 may comprise at least one processor, e.g. one, two, or three processors. The communication apparatus 102, 102a, 102b, 104 further comprises a memory part 504 in order to store and to maintain data. The data may be instructions, computer programs, and data files. The memory part 404 may comprise at least one memory, e.g. one, two, or three memories.

The communication apparatus 102, 102a, 102b, 104 further comprises a data transfer part 506 and an antenna part 508. The communication apparatus 102, 102a, 102b, 104 uses the data transfer part 506 in order to transmit commands, requests, messages, and data to at least one of other communication apparatuses of the wireless communication network 110, 120 via the antenna part 508. The data transfer part 506 also receives commands, requests, messages, and data from at least one of the other communication apparatus 102, 102a, 102b, 104 via the antenna part 408. The communication apparatus 102, 102a, 102b, 104 may further comprises a power supply part 510. The power supply part 510 comprises components for powering the communication apparatus 102, 102a, 102b, 104, e.g. a battery and a regulator.

The memory part 502 comprises a data transfer application for operating, i.e. controlling, the data transfer part 506, an antenna application for operating the antenna part 508, and a power supply application for operating the power supply part 510.

The memory part 504 comprises also an application 505, i.e. a computer program, comprising instructions which, is configured to use at least one of parts 506, 508, 510 in order to perform, i.e. carry out, at least the operations, i.e. the method steps, of the communication apparatus 102, 102a, 102b, 104 described above in this description part and figures, when it is run, i.e. executed, by a computer, e.g. by the communication apparatus 102, 102a, 102b, 104 by means of the processing part 502.

The computer program may be stored in a non-statutory tangible computer readable medium, e.g. an USB stick or a CD-ROM disc.

The invention relates also to the wireless communication network (system) 110, 120 comprising a plurality of communication apparatuses comprising the first communication apparatus 102a and the second communication apparatus 102b described above. Each communication apparatus of the system 110, 120 is configured to provide a bi-directional radio communication with at least one other communication apparatus of the system 110, 120. The wireless communication network 110, 120 according to the invention may be, but is not limited to, BLE mesh network, Thread network, Zigbee network, Public Land Mobile Network (PLMN), WLAN network, cellular network, wireless mesh network, etc. The wireless communication apparatus 102, 102a, 102b, 104 according to the invention may be any wireless device comprising, but not limited to, a mobile device, a node device, a router, a repeater, etc.

As an alternative to including the first part of the NIC 404 to the header field 306 of the packet 300 and the second part of the NIC 406 to the CRC of the data field 308 of the packet 300, the NIC 402 could be included e.g. in the MAC PDU included in the data field 308 of the packet 300 as a normal payload, which enables simple transmission of the NIC 402. However, the communication technique used in the network may support MAC layer security, wherein the MAC PDU comprises the MIC and the MAC PDU is encrypted, expect the very beginning of the packet, i.e. MAC header field, which are used in decrypting process. The MAC level security is preferable especially in a mesh network operation in order to enable the receiving computing apparatus to check that the packet is legitimate before forwarding the packet forward in the mesh network. Therefore, if the NIC 402 is included e.g. in a ciphered part of the MAC PDU, the receiving communication apparatus needs to perform deciphering and integrity protection, e.g. MIC, check procedures for all received packets before it may decide whether the received packet is from the same network to which the receiving communication apparatus belongs or from another network. The deciphering and process integrity check procedures require significantly more processing than performing the simple check based on the CRC of the data field as discussed above. Thus, in addition to not acting on wrong packets at higher levels at least some embodiments of the invention enable avoiding unnecessary deciphering and integrity check procedures at MAC layer of the receiving communication apparatus, which in turn improves the power consumption of the receiving communication apparatus. In other words, the early packet filtering from the header field of packets from other networks enables optimizing the power consumption of the receiving communication apparatus, because decoding processes of another network MAC PDUs may be minimized. Moreover, including the second part of the NIC 406 in the CRC of the data field 308 of the packet 300 by performing the XOR process in the transmitting communication apparatus and in the receiving communication apparatus as discussed above, enables substantially faster definition, i.e. calculation, process than the calculating process of the MIC and may it be performed before transmitting the HARQ feedback (HARQ ACK or HARQ NACK) in the HARQ operation. The HARQ operation, i.e. HARQ combining, is known as an efficient method to reduce Block Error Rate (BLER) of the transmission. At least some embodiments of the present invention described above enables that the receiving communication apparatus of an incorrect network will never send any HARQ ACK message in the HARQ operation. When the transmission is a broadcast or a multicast transmission, the receiving communication apparatuses do not apply the HARQ operation and thus do not send the ACK or NACK message and the receiver ID may be set as a known value.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A communication apparatus comprising
a processor part, and
a data transfer part,
wherein the apparatus is configured to:
receive, by the data transfer part, a packet transmitted by a communication apparatus of a network, the packet comprising a network identification code (NIC) identifying the network to which the communication apparatus that transmitted the packet belongs, the NIC is divided into a first part of the NIC and a second part of the NIC, wherein a header field of the packet comprises the first part of the NIC and the second part of the NIC is included in a data field of the packet, and
define, by the processor part, that the received packet is from a network to which the communication apparatus belongs, if the first part of the NIC of the received packet corresponds to a first part of a NIC of the communication apparatus that received the packet, wherein the NIC of the communication apparatus that received the packet identifies the network to which said communication apparatus belongs thereby facilitating separation of transmissions from different networks.

2. The communication apparatus according to claim 1, wherein the header field of the packet further comprises the identification information representing at least one of the communication apparatus transmitting the packet or the communication apparatus receiving the packet.

3. The communication apparatus according to claim 2, configured to perform a further confirmation that the received packet is from the network to which the communication apparatus belongs based on the identification information representing at least one of the communication apparatus transmitting the packet or the communication apparatus receiving the packet.

4. The communication apparatus according to claim 1, wherein the second part of the NIC is included in an error detection code of a data field of the packet.

5. The communication apparatus according to claim 4, wherein the error detection code is Cyclic Redundant Check (CRC), and in response to definition that the received packet is from the network to which the communication apparatus belongs, the communication apparatus is configured to:
  perform a XOR operation for the second part of the NIC with one of the following: the CRC defined for the data field of the received packet or the CRC included in the data field of the received packet,
  compare the result of the XOR operation to the other one of the following: the CRC defined for the data field of the received packet or the CRC included in the data field of the received packet, and
  define that the reception of the packet was correct, if the result of the XOR operation corresponds with the CRC to which it is compared.

6. The communication apparatus according to claim 5, further configured to:
  determine a message indicating a correct reception of the packet to be transmitted to the communication apparatus from which the packet is received, in response to the detection of a correct reception, or
  determine a message indicating an incorrect reception of the packet to be transmitted to the communication apparatus from which the packet is received, in response to the detection of an incorrect reception.

7. The communication apparatus according to claim 1, further configured to:
  define that the received packet is from another network, if the first part of the NIC of the received packet differs from the first part of the NIC of the communication apparatus, and
  obtain information representing activity of said another network based on at least one packet received from said another network.

8. A communication apparatus comprising
  a processor part, and
  a data transfer part,
wherein the apparatus is configured to:
  determine, by the processor part, a packet to be transmitted, by the data transfer part, to at least one other communication apparatus, the transmitted packet comprises a network identification code (NIC) identifying a network to which said communication apparatus belongs, the NIC is divided into a first part of the NIC and a second part of the NIC, wherein a header field of the packet comprises the first part of the NIC and the second part of the NIC is included in a data field of the packet.

9. The communication apparatus according to claim 8, wherein the header field of the packet further comprises identification information representing at least one of the communication apparatus transmitting the packet or the communication apparatus receiving the packet.

10. The communication apparatus according to claim 8, wherein the second part of the NIC is included in an error detection code of a data field of the packet.

11. The communication apparatus according to claim 10, wherein the error detection code is Cyclic Redundant Check (CRC), and the communication apparatus is configured to:
  perform a XOR operation for the second part of the NIC with the CRC defined for the data field of the packet, and
  include the result of the XOR operation in the data field of the transmitted packet as the error detection code.

12. The communication apparatus according to claim 1, configured to obtain the NIC by configuration, other communication technique, or receiving a broadcast message comprising the NIC.

13. The communication apparatus according to claim 1, wherein the packet is a physical (PHY) layer packet.

14. The communication apparatus according to claim 1, wherein the NIC is independent from an actual Network ID of the network, the NIC is at least partly derived from the actual Network ID of the network, or the NIC is directly the actual Network ID of the network.

15. The communication apparatus according to claim 1, wherein the network is a wireless mesh network, a wireless Bluetooth Low Energy (BLE)-based radio network, a wireless local area network (WLAN), Thread network, Zigbee network, Public Land Mobile Network (PLMN), or cellular network.

16. A communication system comprising
  a plurality of communication apparatuses comprising a first communication apparatus and a second communication apparatus,
  wherein each communication apparatus of the system is configured to provide a bi-directional radio communication with at least one other communication apparatus of the system,
  wherein the first communication apparatus is configured to determine a packet to be transmitted to at least the second communication apparatus, the transmitted packet comprises a network identification code (NIC) identifying a network to which the first communication apparatus belongs, the NIC is divided into a first part of the NIC and a second part of the NIC, wherein a header field of the packet comprises the first part of the NIC and the second part of the NIC is included in a data field of the packet, and
  wherein the second communication apparatus is configured to:
    receive the packet transmitted by the first communication apparatus, and
    define that the received packet is from the network to which the second communication apparatus belongs, if the first part of the NIC of the received packet corresponds to a first part of a NIC of the second communication apparatus, wherein the NIC of the second communication apparatus identifies the network to which the second apparatus belongs thereby facilitating separation of transmissions from different networks.

17. A method for a communication apparatus, comprising steps of:
  receiving a packet transmitted by a communication apparatus of a network, the packet comprising a network identification code (NIC) identifying the network to which the communication apparatus which transmitted the packet belongs, the NIC is divided into a first part of the NIC and a second part of the NIC, wherein a header field of the packet comprises the first part of the NIC and the second part of the NIC is included in a data field of the packet, and
  defining that the received packet is from a network to which the communication apparatus belongs, if the first part of the NIC of the received packet corresponds to a first part of a NIC of the communication apparatus that received the packet, wherein the NIC of the communication apparatus that received the packet identifies the network to which said communication apparatus belongs thereby facilitating separation of transmissions from different networks.

18. A method for a communication apparatus, comprising steps of:
    determining a packet to be transmitted to at least one other communication apparatus, the packet comprises a network identification code (NIC) identifying a network to which the communication apparatus belongs, the NIC is divided into a first part of the NIC and a second part of the NIC, wherein a header field of the packet comprises the first part of the NIC and the second part of the NIC is included in a data field of the packet.

19. A computer program comprising instructions which, when the program is executed by a communication apparatus, cause the communication apparatus to carry out at least the steps of the method according to claim 17.

20. A non-transitory computer readable medium comprising the computer program according to claim 19.

21. The communication apparatus according to claim 8, configured to obtain the NIC by configuration, other communication technique, or receiving a broadcast message comprising the NIC.

22. The communication apparatus according to claim 8, wherein the packet is a physical (PHY) layer packet.

23. The communication apparatus according to claim 8, wherein the NIC is independent from an actual Network ID of the network, the NIC is at least partly derived from the actual Network ID of the network, or the NIC is directly the actual Network ID of the network.

24. The communication apparatus according to claim 8, wherein the network is a wireless mesh network, a wireless Bluetooth Low Energy (BLE) based radio network, a wireless local area network (WLAN), Thread network, Zigbee network, Public Land Mobile Network (PLMN), or cellular network.

* * * * *